United States Patent [19]
Meredith et al.

[11] 3,953,768
[45] Apr. 27, 1976

[54] PORTABLE FLUORESCENT LAMP AND INVERTER THEREFOR

[76] Inventors: Ronald D. Meredith, 25 Heather Place, Hillsborough, Calif. 94010; John T) Shoberg, 1265 Fallen Leaf Drive, Milpitas, Calif. 95035

[22] Filed: May 22, 1973

[21] Appl. No.: 362,669

Related U.S. Application Data

[62] Division of Ser. No. 101,040, Dec. 23, 1970, abandoned.

[52] U.S. Cl. .......................... 317/31; 240/10.6 CH; 320/40
[51] Int. Cl. ............................................. H02h 3/24
[58] Field of Search ............... 317/33 R, 31, 33 VR; 240/51.11 R, 10.6 R, 10.6 CH; 307/130; 320/39, 40, 45, DIG. 1

[56] References Cited
UNITED STATES PATENTS

| | | | |
|---|---|---|---|
| 3,435,206 | 3/1969 | Swanson | 240/51.11 R |
| 3,443,191 | 5/1969 | Medlar | 320/40 |
| 3,445,746 | 5/1969 | Delatorre | 317/33 R |

Primary Examiner—J. D. Miller
Assistant Examiner—Harry E. Moose, Jr.
Attorney, Agent, or Firm—Schapp and Hatch

[57] ABSTRACT

A portable battery-operated fluorescent light with an inverter having a single transistor Class C oscillator and a gapped-core nonsaturating reactor transformer with a parallel capacitance in the secondary circuit to cause the secondary circuit to act as a resonant tank circuit for the oscillator. The lamp is capacitor-ballasted, and the batteries are rechargeable. A large capacitance is connected in parallel with the batteries to decrease effective battery impedance. The light has an automatic shutoff circuit using a zener diode to shut off the inverter when the batteries are discharged to the safe limit and a self-contained constant voltage current-taper charging circuit for the cells, with the same zener diode as a voltage reference. A jam-in lamp socket is shown which allow the lamp to be inserted straight into the socket without rotation, and a method for pulsing the filament at one end of the lamp to improve startup of aging lamps is disclosed.

7 Claims, 13 Drawing Figures

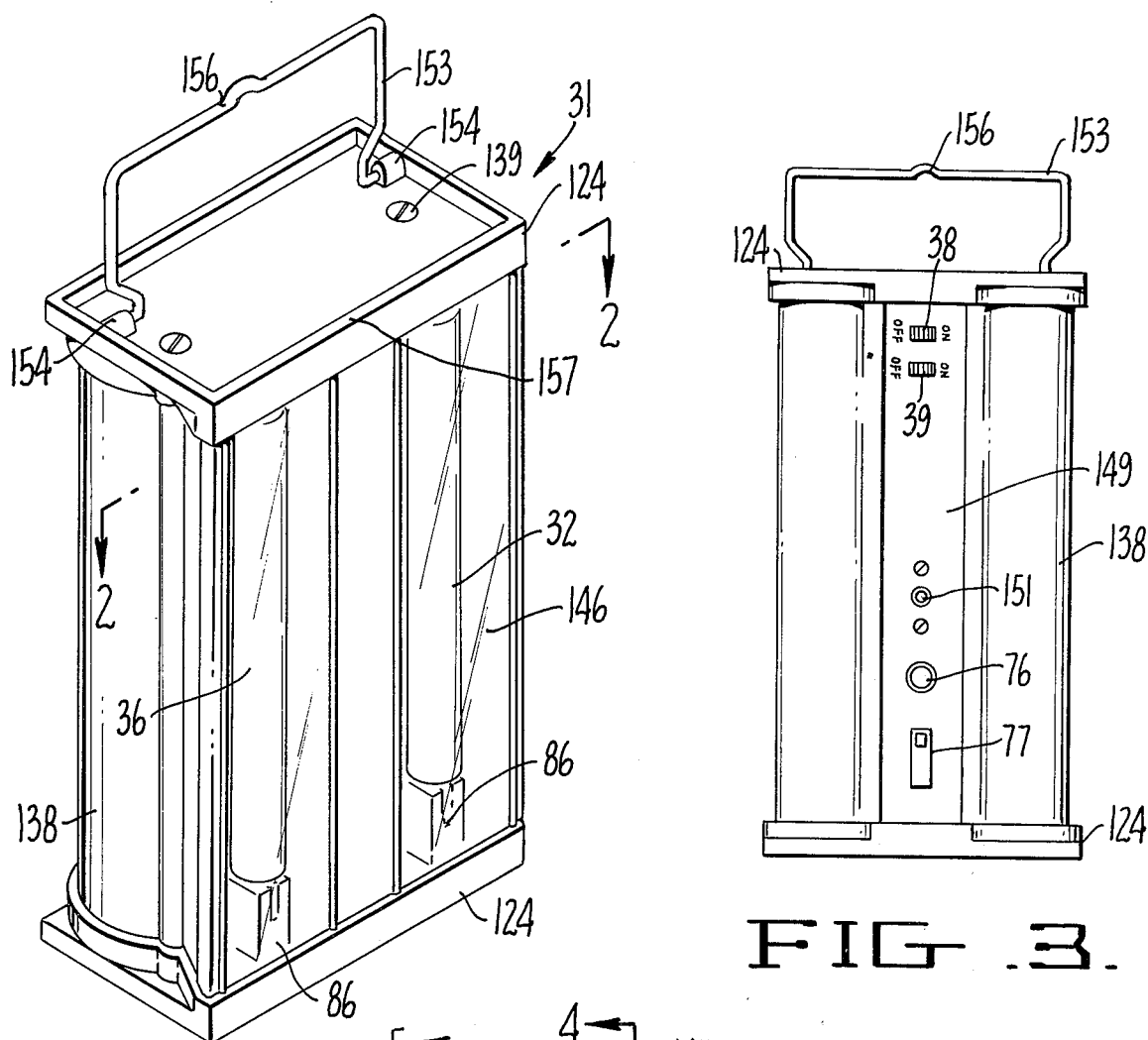

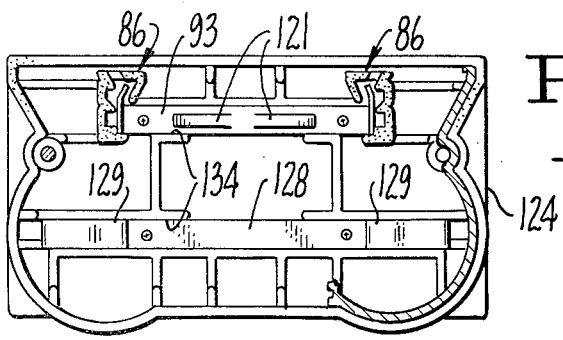
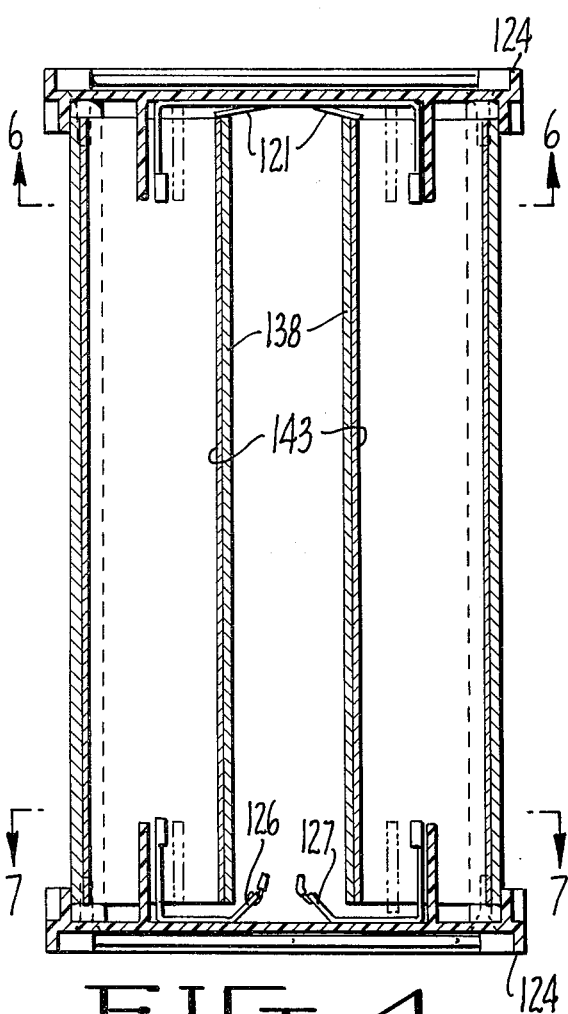
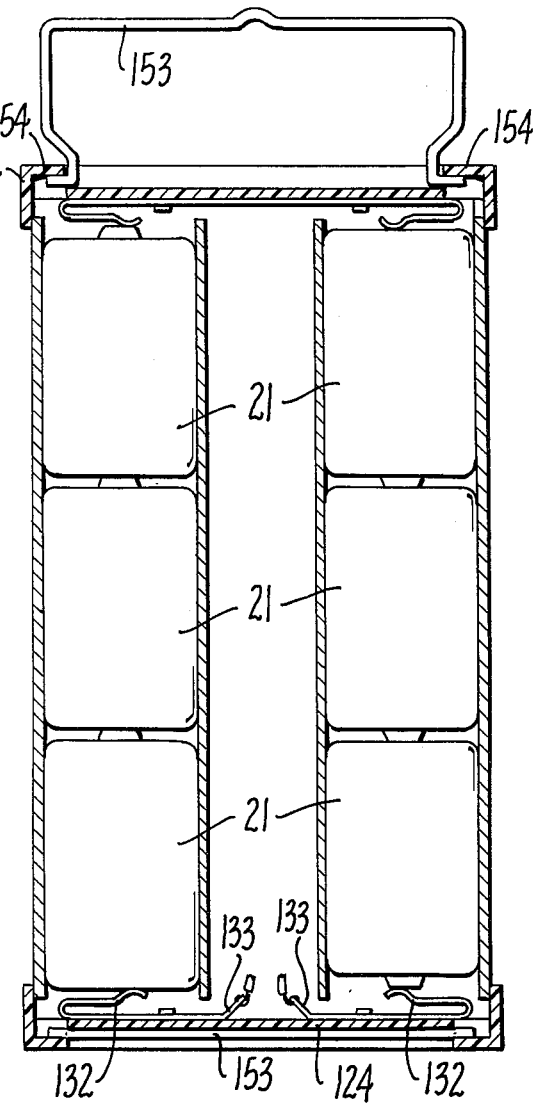
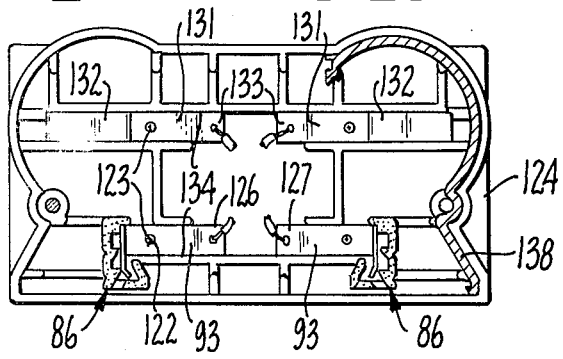

INVENTORS
RONALD D. MEREDITH
BY JOHN T. SHOBERG
Schapp & Hatch
ATTORNEYS

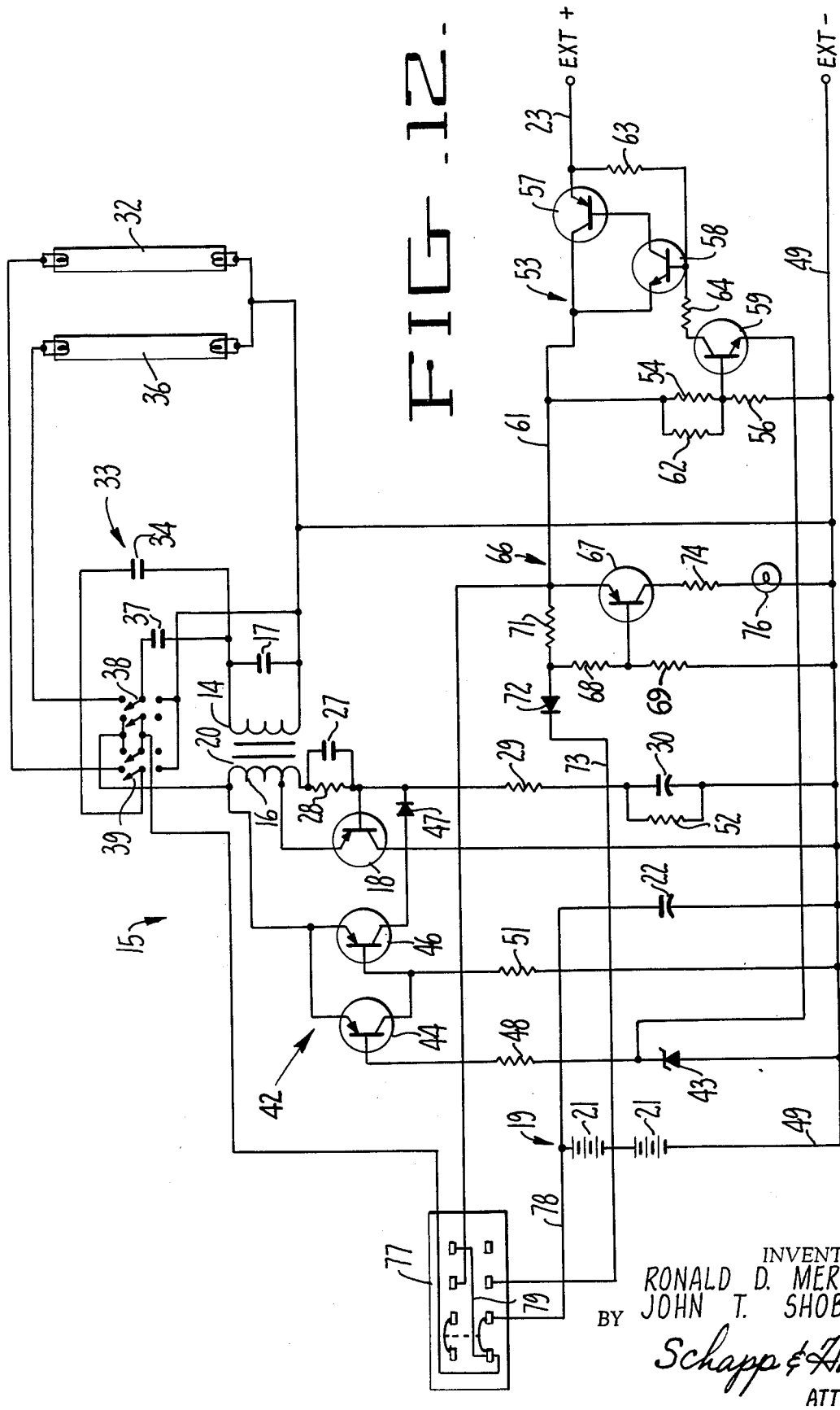

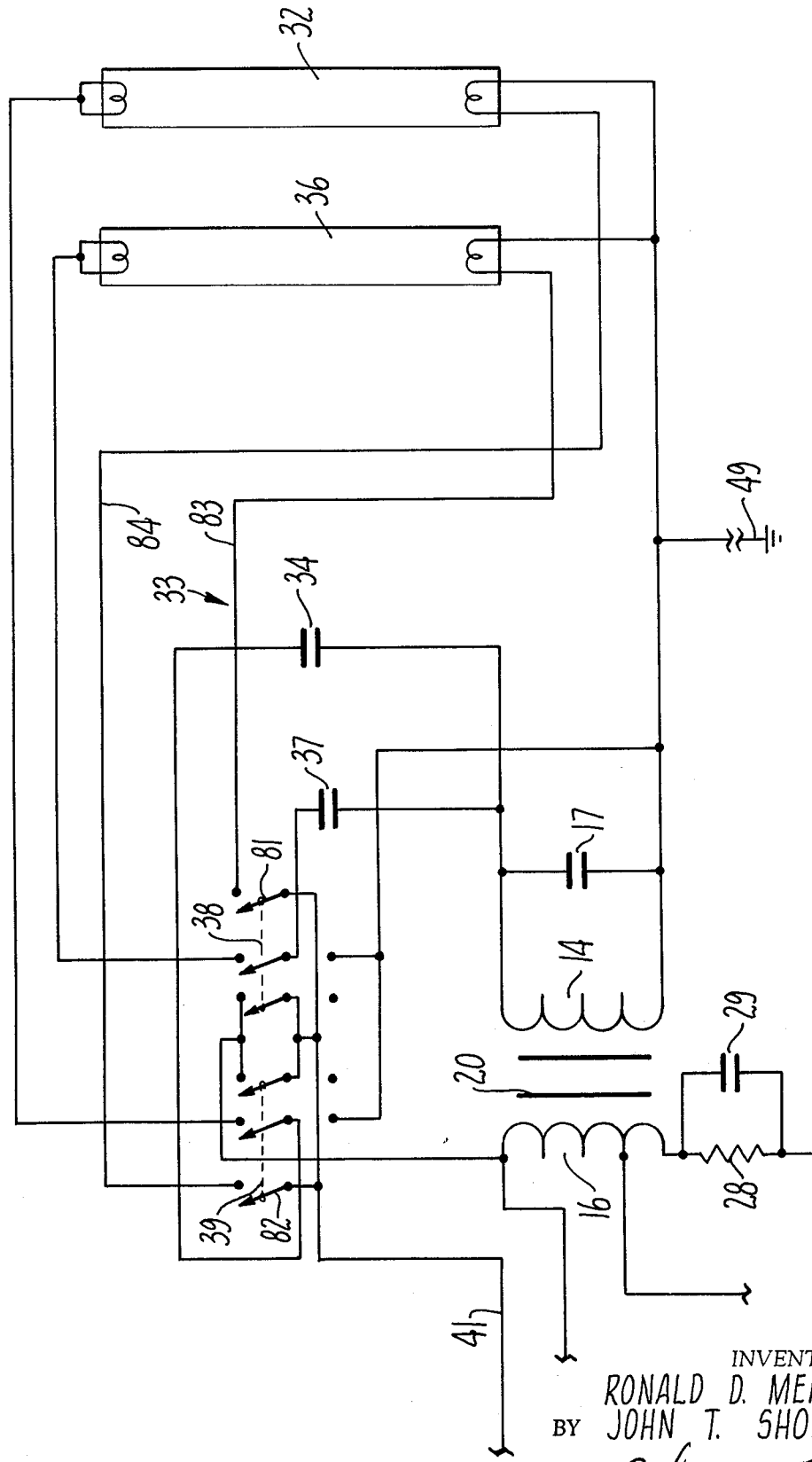

PORTABLE FLUORESCENT LAMP AND INVERTER THEREFOR

This is a division of application Ser. No. 101,040, filed Dec. 23, 1970, now abandoned.

BACKGROUND OF THE INVENTION

This invention relates to a PORTABLE FLUORESCENT LAMP AND INVERTER THEREFOR, and more particularly to a fluorescent lamp operated on high-frequency alternating current produced from battery direct current by a transistor inverter.

Despite the desirable efficiency in comparison with incandescent lamps, portability has been difficult to achieve with fluorescent lamps for a number of reasons. Direct d.c. operation of fluorescent lamps requires a relatively large ballast, and fairly high voltage for starting. Apparatus designed along such lines would thus be large and heavy and require a large number of battery cells to produce sufficient starting voltage. The designs for conventional 60-cycle a.c. fluorescent lights are likewise poorly adapted for portable use, as they generally involve inductive ballasting and relatively high voltages, as well as requiring use of an inverter, with its consequent losses.

Portable inverters for producing a.c. power from battery supplies have suffered from a number of disadvantages, especially as applied to an appliance such as a fluorescent lamp. First, the circuitry has been complex rather than simple, leading to high costs for labor and materials in their manufacture. This cost has deterred acceptance of portable fluorescent lights when compared with the less efficient but also less expensive portable incandescent lights. Another disadvantage has been the inefficiency of power conversion of many such inverters, leading to a high operating cost per lumen. This operating cost tended to reduce the advantage of generally higher efficiency of fluorescent lamps shown in non-portable applications.

The use of rechargeable cells, while dramatically decreasing operating costs, poses problems with protection of the cells both from excessive discharging and from excessive charging. Certain types of rechargeable cells can be permanently impaired by discharging them beyond a particular level, and the same is true of excessive charging of the cells, i.e., beyond a full-charge point.

Larger sizes of fluorescent tubes are commonly inserted into sockets which either require the tube to be rotated after lateral insertion, or which require the tube to be inserted longitudinally into one socket and then be allowed to spring back into the other socket. When smaller lamps are used as in the present device to close proximity to a reflector and protective shielding, neither conventional form of socket is entirely satisfactory, due to difficulties in manipulating the lamp into the socket.

SUMMARY OF THE INVENTION

The fluorescent lamp and inverter of the present invention uses a circuit considerably improved simplicity and economy to produce a high frequency alternating current output. The simplicity and economy of its construction enable it to be brought into competition with portable incandescent lamps. The design of the circuit also results in enhanced regulation of the output and greater efficiency of power conversion, lowering the operating cost of the lamp.

As the portable fluorescent lamp of the present invention operates on high-frequency alternating current, it can be ballasted by a relatively small capacitance at a considerable saving in weight and cost. Also, fluorescent lamps are more easily started at higher frequencies of supply power, so that the customary inductive ballast may be eliminated. Furthermore, the efficiency of fluorescent lamps in general rises with rising frequency of the power supply, a factor of notable importance when operating from limited power sources such as batteries. Since the supply power is converted to a.c., it may readily be transformed to the appropriate voltage level for starting the lamp without the inordinately large number of battery cells that direct d.c. starting would require.

The design of the present circuit also permits the frequency of the alternating current to be raised beyond the level of human audibility, so that the user is not annoyed by hums or high-pitched squeals emitted by the lamp in operation.

The lamp of the present invention contains both an automatic discharge-limiting circuit, and a constant voltage current-taper charge-limiting circuit operative when its cells are being recharged. The discharge limiter operates when the inverter is supplying current to the fluorescent tubes, by sensing the output voltage of the cells under load. When that voltage drops to a selected point beyond which damage to the cells might occur, the discharge circuit blocks the inverter from further operation, thus cutting off the light and stopping all major current outflow from the cells. After recharge of the cells to raise their output voltage level, operation of the inverter is restored and the tubes will relight.

To prevent damage from over-charging of the cells, a protective circuit is included which operates during the charging mode to reduce charging current as the cell voltage increases. This circuit uses a transistor as a series current limiter, responsive to the rising battery voltage compared to a zener diode. As the voltage of the cells rises, current is decreased and finally terminated.

The problems of manipulating the lamp tube into the socket in the compact arrangement of the present device have been met by providing a "jam-in" socket, that is, one into which the lamp may be fully and operatively inserted with lateral motion only, eliminating the rotation or longitudinal motion previously required. Despite the ease of insertion, the lamp is securely retained in the socket by detents and its terminals firmly contacted by the electrical conductors. At the same time, its removal when desired is not impeded.

Accordingly, it is a principal object of the present invention to provide a portable fluorescent light of the character described, having improved economy and simplicity of construction with increased efficiency of operation.

It is a further principal object of the present invention to provide an inverter of the character described utilizing a minimum number of parts to produce a well-regulated high-frequency alternating current output.

Another object of the present invention is to provide a portable fluorescent light of the character described, which functions with a lightweight, inexpensive ballasting device.

A further object of the present invention is to provide an inverter of the character described utilizing the out-

3 put transformer secondary as an element of a resonant tank circuit for a single-transistor class C Hartley-type oscillator circuit.

Yet another object of the present invention is to provide a portable fluorescent light of the character described having inexpensive batteries and means to decrease internal battery impedance.

Still another object of the present invention is to provide a portable fluorescent light of the character described having automatic discharge and charge-limiting features.

A still further object of the present invention is to provide a portable fluorescent light of the character described which is virtually silent in operation.

Yet a further object of the present invention is to provide a portable fluorescent light of the character described having a lamp socket adapted to ease insertion and removal of the lamp.

Further objects and advantages of the present invention will become apparent as the specification progresses, and the new and useful features thereof will be fully defined in the claims attached hereto.

BRIEF DESCRIPTION OF THE DRAWINGS

The preferred form of the present invention is illustrated in the accompanying drawings, forming part of this specification, in which:

FIG. 1 is a perspective view of the portable fluorescent light of the present invention.

FIG. 2 is a cross-sectional view on an enlarged scale, taken approximately along the plane of lines 2—2 of FIG. 1.

FIG. 3 is a rear elevational view of the portable fluorescent lamp, on a reduced scale.

FIG. 4 is a cross-sectional view on a slightly reduced scale, taken approximately along the plane of lines 4—4 of FIG. 2.

FIG. 5 is a cross-sectional view on a slightly reduced scale, taken approximately along the plane of lines 5—5 of FIG. 2.

FIG. 6 is a view partly in cross-section, taken approximately along the plane of lines 6—6 of FIG. 4.

FIG. 7 is a view partly in cross-section taken approximately along the plane of lines 7—7 of FIG. 4.

FIG. 12 is a schematic diagram of the portable fluorescent light, inverter and limiting circuits of the present invention.

FIG. 13 is a fragmentary schematic diagram showing a modified portion of the circuit diagram of FIG. 12 useable in connection with the socket structure modification shown in FIG. 11.

Figure 8:
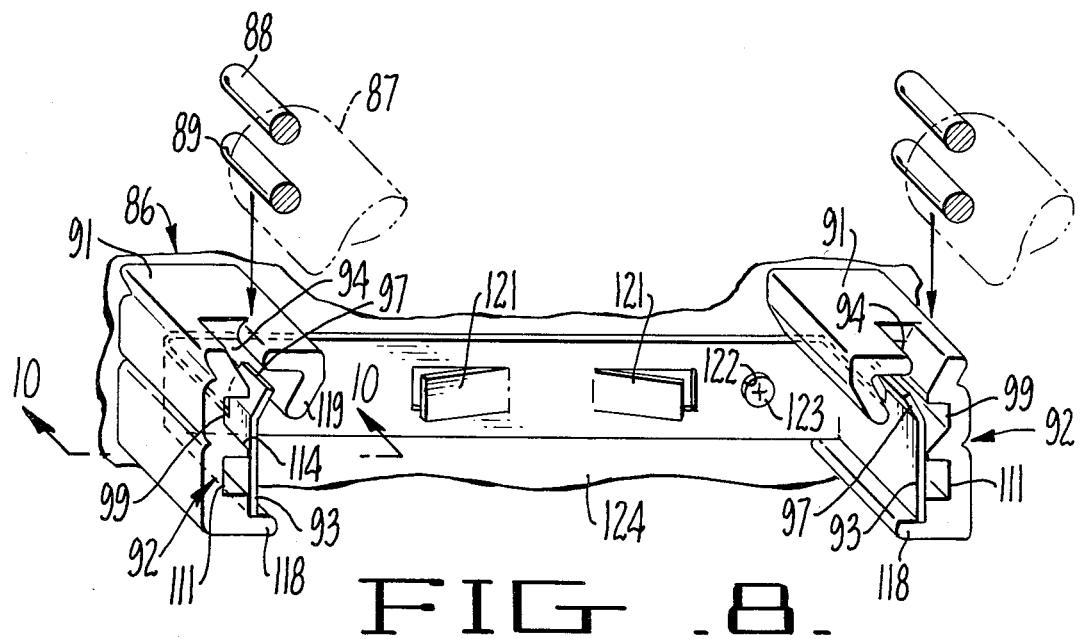
FIG. 8 is a perspective view on an enlarged scale of the structure of the lamp sockets.
Figure 9:
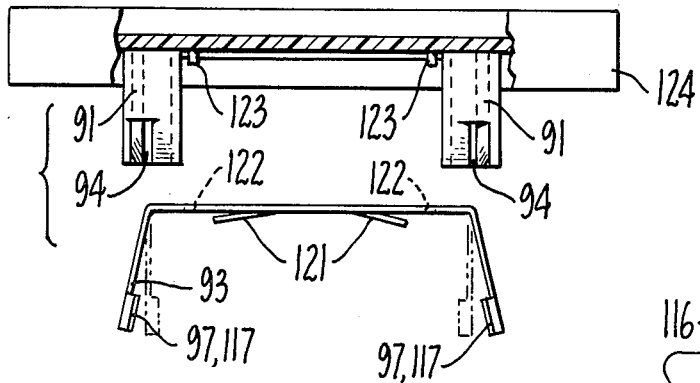
FIG. 9 is an exploded plan view on a reduced scale of the socket structure of FIG. 8, with parts shown broken away for clarity.

While only the preferred forms of the present invention have been shown here, it should be understood that various changes or modifications may be made within the scope of the claims attached hereto without departing from the spirit of the invention.

4

DESCRIPTION OF THE PREFERRED EMBODIMENTS

Referring to the drawings in detail, and particularly to FIG 12, it will be seen that the portable fluorescent light 31 of the present invention includes a source of direct current 19, a high frequency inverter 15 for converting the direct current of said source to alternating current, a fluorescent lamp 32 supplied with high frequency alternating current from the inverter 15, and a ballast means 33 connected to the lamp tube 32 to limit the current flow to the lamp.

The inverter 15 of the present invention includes a single-transistor class C oscillator and a gapped-core non-saturated transformer reactor 20. The circuit is basically a Hartley-type oscillator, with the secondary winding 14 of the transformer having a capacitor 17 connected in parallel to form a resonant tank circuit for the oscillator. The inverter 25 uses a PNP transistor 18 with the emitter of the transisstor connected to the source of d.c. power 19 through the primary winding 16 of the transformer 20. Although a PNP transistor is shown, it will be appreciated that with the appropriate reversal of connections, an NPN transistor could likewise by applied.

The d.c. power source 19 includes a plurality of battery cells 21, and capacitor 22 in parallel with the cells 21. Conventional carbon-zinc dry cells may be used but rechargeable secondary cells are preferred. Connections 23 are provided for an external source of charging power which is not part of the present invention. The capacitor 22 lowers the effective impedaance of the batteries 21, permitting use of less expensive batteries without excessive sacrifice of power.

The primary 16 is tapped for connection to the emitter of the transistor 18, and also connects to a capacitor 27 and a resistor 28 connected in parallel. the capacitor 27 and the resistor 28 provide a.c. feedback to the base of the transistor 18. A resistor 29 connects from the base of the transistor 18 to ground through a capacitor 30 to provide base drive at startup. Power is fed to the inverter 15 through connection of the end of the primary 16 opposite the resistor 28 and capacitor 27 to the d.c. supply line 41 by the switches 38 and 39. Although the inverter 15 is shown forming a portion of a portable fluorescent light generally indicated at 31, its separate utility may be appreciated.

The ballast means shown here is a capacitor 34 connected in series with the lamp 32. A second lamp 36, having a similar capacitor 37 for ballast, may be connected in parallel with the lamp 32 by closing switch 38 connected in series with the lamp 36.

Switches 38 and 39 are DPDT switches which operate in one position to connect the d.c. power form the batteries 21 to the inverter and also to connect the high frequency a.c. power to the associated lamp. In the other position on either switch, the associated ballast capacitor 34 or 37 is placed in parallel with the capacitor 17 which is permanently in parallel with the secondary winding 14. Thus when one of the lamps is off and the other on, the unused ballast capacitor 34 or 37 is used to compensate for the removal of the load effect of the unlit lamp, alleviating a serious problem of power loading the resonant characteristics of the inverter when only one lamp was lit.

The circuitry of the portable fluorescent light 31 also includes a voltage sensing circuit generally indicated at 42 connected to the storage cells 21 and the inverter 15. The voltage sensing circuit 42 operates to terminate the major current outflow from the cells 21 to the inverter 15 at a preselected voltage level, selected as being indicative of a state of discharge of the cells 21 beyond which the cells should not be further discharged, to avoid permanent damage. The voltage sensing circuit 42 includes a zener diode 43 connected in the circuit 42 so that it lies between the positive and negative potential supplied by the cells 21, a first transistor 44, also connected between the positive and negative poles of the cells 21, and having its base connected through the zener diode 43 to one pole of the cells 21, and a second transistor 46 connected between the positive and negative poles of the cells 21, with its base connected to the first transistor 44. The base of the oscillator transistor 18 is connected to one terminal of the second transistor 46 through a diode 47. When the emitter of the transistor 44 is at a higher voltage than the zener diode 43, the first transistor 44 becomes forward biased and conducts; when the emitter of transistor 44 approaches zener voltage, the first transistor 44 is reversed-biased, and cut off.

The second transistor 46 becomes reverse-biased upon conduction of the first transistor 44, and thus is cut off when the first transistor 44 is forward biased and conducting. Since the second transistor 46 is forward biased and conducting when the first transistor 44 is cut off, the second transistor essentially inverts the signal from the first transistor. The output of the second transistor 46 is connected to the base of the oscillator transistor 18 so that conduction by the second transistor 46 clamps the drive of oscillator transistor 18 and cuts off its conduction.

As shown in the present circuit, the first and second transistors 44 and 46 are PNP transistors, and the first transistor 44 has its base terminal connected to the cathode of the zener diode 43 through a resistance 48 and its emitter connected through the switches 38 and 39 to the direct current buss line 41. The second transistor 46 has its emitter likewise connected through the switches 38 and 39 to the positive d.c. line 41, its base connected to the collector of the first transistor 44 with both of those terminals being connected to the negative supply line 49 through a resistance 51. The collector of the second transistor 46 is connected to the anode of the diode 47, and the cathode of the diode 47 is connected to the base of the oscillator transistor 18. It will be appreciated that the voltage sensing circuit 42 could be constructed as readily wit NPN transistors with the appropriate reversal of the polarity of the connections.

In operation, the voltage at which shut-off of the inverter is desired to prevent damage to the cells 21 is selected by selecting the voltage characteristics of the zener diode 43. When the cell voltage falls to the level, the emitter of transistor 44 is at that level, thereby reverse-biasing the base of the first transistor 44 and causing it to cut off and cease conduction. The cut-off of the first transistor 44 causes the second transistor 46 to become forward-biased and conduct, and the conduction of the second transistor 46 palces a positive potential through the diode 47 on the base of the oscillator transistor 18. The oscillator transistor 18 thereby becomes clamped and ceases oscillation.

During the time the inverter 15 is running, before the oscillator transistor 18 is cut off by the voltage sensing circuit 42, the capacitor 30 is kept more or less fully charged, and is thus enable to provide the base drive for the oscillator transistor 18, which it does provide immediately after initial start-up of the inverter circuit. The lack of base drive after start-up does not affect the normal running of the inverter, as drive for the oscillator transistor 18 is furnished by the tank circuit formed by the transformer inductor 20 and the capacitor 17 in its secondary circuit. However, once oscillation has been blocked by the voltage-sensing circuit 42, it remains blocked, as no base drive is available through the capacitor 30 due to its fully charged condition, and no oscillation is present in the transformer 20 to provide an alternate source for that drive.

A resistance 52 functions as a bleeder in parallel with the capacitor 30, so that its fully charged condition may be gradually dissipated to permit re-starting of the inverter. It should be noted that the bleeder resistance 52 will be ineffective to dissipate the charge on the capacitor 30 if the voltage sensing circuit is continuing to apply positive potential to the base of the oscillator transistor 18 through the diode 47, as to the same positive potential will be available through the resistance 29 to continue to charge the capacitor 30.

As shown here, the portable fluorescent light 31 also includes a constant-volate current-taper charger circuit for charging the cells 21 from an external source of direct current. The charger circuit is generally indicated at 53, and includes the zener diode 43 described above in connection with the voltage sensing circuit, and the resistance 48 in series with the zener, forming together one voltage divider connected in parallel with the cells 21. The charger circuit 53 also includes a second voltage divider formed by a pair of resistances 54 and 56, also connected in parallel with the cells 21, and three transistors, 57, 58, and 59. The transistor 57 is disposed in series-pass fashion between the line 23 leading to the external source of direct current and the cells 21, with its base connected to the transistor 58.

The transistor 59 has its base connected to the common point between the two resistances 54 and 56 forming a voltage divider. The collector and the emitter of the transistor 59 lie in series between the base of the transistor 58 and the negative d.c. buss 49 via the zener diode 43. The collector and the emitter of the transistor 58 lie in series between the base of the transistor 57 and its collector, downstream of the transistor 57. As illustrated here, the transistor 57 is a PNP transistor, while transistors 58 and 59 are NPN transistors. However, transistors of the opposite polarities could be used with the appropriate reversal of the polarity of their connections.

As the cells 21 approach fully charged condition, the voltage across them rises. The potential applied to the base of the transistor 59 from the d.c. supply line 51 downstream of the transistor 57 through the voltage divider formed by the resistances 54 and 56 will rise with the rising voltage of the cells 21. This voltage applied to the base of the transistor 59 is calibrated by the resistance 62 in parallel with the resistance 54 to set the cut-off level precisely. Using an NPN transistor for the transistor 59 as shown here, the emitter of the transistor is connected to the zener diode 43 and thus held at a constant voltage.

As the base of the transistor 59 becomes increasingly forward-biased with respect to its emitter due to the rising voltage in the line 61 as the battery cells 21 are near full charge, the conduction of transistor 59 increases.

The increasing conduction in the transistor 59 causes increasing reverse-bias and accompanying decreasing conduction in the transistor 58. Since the transistor 58 is interposed between the base and the collector of the transistor 57, it operates to provide base drive to the transistor 57. Thus, as the transistor 58 decreases in conduction, it thereby decreases the base drive provided to the transistor 57, causing transistor 57 to decrease in conduction and taper down the current supply to the battery cells 21.

As here shown, the transistor 57 is a PNP transistor, and the transistor 58 and 59 are NPN transistors, so that the transistor 58 has its emitter connected to the positive pole of the cells 21 via the line 61 and its collector connected to the base of the transistor 57, with the base of the transistor 58 connected through a resistor 63 to the positive pole of the external source of direct current along line 23. The transistor 59 has its collector connected through a resistor 64 to the base of the transistor 58 and its emitter connected to the common point between the zener diode 43 and the resistor 48. The PNP transistor 57 has its emitter connected to the positive pole of the external source of direct current along the line 23 and its collector connected to the positive pole of the cells 21 by the line 61. The circuit is completed by connecting the negative pole of the cells 21 to the negative pole of the external source of direct current along line 49.

A charge indicator circuit generally indicated at 66 operates to inform the user that the battery cells 21 have reached near full charge. A PNP transistor 67 has its emitter connected to line 61, its base connected to the common point of a voltage divider formed by resistance 68 and 69, and its collector connected through a resistance 74 to an indicator lamp 76. As the voltge of the charging cells 21 rises, the transistor 67 becomes increasingly reverse-biased until it reaches a cut-off point, at which it terminates current flow through the indicator lamp 76.

The values of the resistors 68 and 69 are selected such that the cut-off point for the transistor 67 is reached slightly before the charger circuit 53 completely cuts off the flow of current to the cells 21, as the cut-off of the transistor 57 in the charger circuit 53 as the cells 21 near full-charge voltage is a roughly exponential-taper function. it is therefore desirable that the user be given an indication that the cells 21 are for all practical purposes fully charged at the end of a reasonable period of time by the extinguishing of the indicator lamp 76, although charging may in fact continue without harm at extremely low rates for an extended period of time beyond that point. The user may thus reactivate the lamp on satisfactorily charged batteries as soon as the indicator lamp 76 goes out, but may if desired leave the circuit to continue charging the cells for an extended period, such as overnight.

The external source of direct current applied to the line 23 is nominally approximately 12 volts, while the maximum charging potential recommended for rechargeable cells of the type envisioned in the current device is approximately 10.5 volts. A voltage drop is imposed on the potential in line 23 by the transistor 57 so that the voltage in line 61 is approximately 11 volts and a further voltage drop is imposed by the series resistor 71 and the protective diode 72 so that the potential at maximum in the charging supply line 73 downstream of the diode 72 is approximately 10.5 volts.

Since this maximum voltage is considered to be of some importance, the calibration resistance 62 in parallel with the resistance 54 is customselected during the manufacture of the circuit to cause the cut-off of the charger circuit 53 to occur at the point when a maximum of 10.5 volts is reached. Alternatively, of course, the calibration resistance 62 may be a variable resistor adjusted for these calibration purposes and in either event is in the neighborhood of 10–15,000 ohms resistance. The diode 72 prevents outflow from the cells 21 during charging should the external d.c. source be of too low or reverse voltage.

A control switch 77 of the multi-pole type allows the portable light 31 to be switched between three modes of operation. The switch 77 is of the two-gang type in which any tow adjacent poles of four poles on each gang may be connected together by positioning the switch. The ganged movable members of the switch 77 are here shown in the position appropriate for operation of the portable light 31 on its internal power source, that is, the battery cells 21. In the position shown, an operative connection is made from a line 78 leading to the positive pole of the battery cells 21 to the positive d.c. buss 41 leading to the switches 38 and 39.

In the center position of the switch 77, the charging line 73 is connected to the line 78 to the positive pole of the cells 21 to supply them with charging current. In the third position of the switch 77, the d.c. supply line 61 is connected through a jumper 79 to the same terminal of the switch 77 as the d.c. positive buss 41, and thus positive d.c. power from the external source at line 23 is supplied to the d.c. positive buss 41 leading to the switches 38 and 39 and ultimately to the inverter circuit 15 and the lamps 32 and 36.

Exemplary values of the components usable in the lamp and inverter circuit here shown are as follows: capacitor 17, 1,500 pf; transistor 18, 2N2148; battery cells 21, 6 D-size rechargeable cells; capacitor 22, 470 mf., 25 v.; capacitor 27, 1 mf., 50 v.; resistor 28, 47 ohms; resistor 29, 1,500 ohms; lamps 32 and 36, 4 watt T 5; capacitors 34 and 37; 3,000 pf.; capacitor 30, 470 mf. The bleeder resistor 52 is selected to give a satisfactory time of decay of the charge on the capacitor 30, and a value of 6,800 ohms has been found useful.

The transformer reactor 20 may be obtained from a number of manufacturers, but for example may be a Siemens Ferrite "Cupcore" having a 26 × 16 mm. core, Siemens order No. B65671–lL0160-A022, having an $A_L$ of 160 nH/turn. The primary of the transformer reactor 20 is wound with 9 ½ turns and is tapped at 2 ½ turns for the connection to the emitter of the transistor 18; the secondary has 275 turns.

Further illustrative component values are as follows: zener diode , 1N4148; resistor 48, 3,000 ohms; resistor 51, 1,500 ohms; resistor 52, 6,800 ohms; resistors 54 and 56, 3,000 ohms each; transistor 57, 2N2148; transistors 58 and 59, 2N3569; resistor 63, 1,000 ohms; resistor 64, 470 ohms; transistor 67, 2N3645; resistor 68, 220 ohms; resistor 69, 4,700 ohms; resistor 71, 4.7 ohms; diode 72, 1N4001; resistor 74, 150 ohms.

The frequency of the output of the inverter circuit 15 is approximately 25 kHz, well above normal human audibility. A very advantageous stability of frequency under variation of input voltage has been found with the present inverter circuit 15, due in part to the nonsaturated gapped-core nature of the transformer 20 and the fact that it operates in a resonant circuit, having a high Q factor. This stability is of the order of 10% variation in frequency over a two to one voltage supply range.

A further advantage of the present inverter circuit 15 over the two-transistor "toggle" or push-pull arrangements is that no auxiliary starting circuitry is required, since any perturbation in the circuit supplied will cause the circuit to begin oscillation. As shown in the present embodiment, the lamps 32 and 36 are operated in the "instant-start" with their filaments being shorted, as no preheating is used. However, in the embodiment shown in FIG. 13, the filaments of the lamps 34 and 36 at the ground potential end of the lamps are briefly flashed with a low-voltage pulse to assist in starting. This modification has been found to be advantageous in dealing with aging lamps, which with use become reluctant to start in the "instant-start" mode.

As shown in FIG. 13, the circuit is modified by adding an extra pole to each of the switches 38 and 39. The extra poles are indicated at 81 and 82, and are each ganged together with the other two poles of their respective switch 38 or 39. The poles 81 and 82 are single-throw momentary-contact type, and are each connected to the d.c. positive line 41. In operation, they are thrown by the turning on of the switch 38 and 39, and they supply battery d.c. voltage along their respective lines 83 and 84 to one side of the filament at the grounded end of one of the lamps 32 or 36 for a fraction of a second when the switch 38 and 39 are first closed. This operation differs from normal use of the strating filaments of the lamps both in the low voltage used and the brief duration, one second havaing been found satisfactory.

Turning now particularly to FIGS. 6 through 11, particularly to FIG. 8, there is shown a socket generally indicated at 86 for tubular lamps such as the lamps 32 and 36 previously described. Such lamps have what are commonly referred to as bipin bases 87, having a pair of identical pins 88 and 89 protruding therefrom. The pins 88 and 89 have been given separate numbers herein merely for the purposes of convenience in description.

The socket 86 includes a housing 91 formed of an insulating material and adapted to receive and enclose the pins 88 and 89 of the bipin base 87, a guide element generally indicated at 92 disposed within the housing 86, and an electrical conductor 93 extending generally in a plane parallel to the guide element 92. The housing 91 has an entrance slot 94 formed in the housing 91 to admit the pins 88 and 89 of the base 87 one after another in a direction which is lateral to the pins 88 and 89.

The guide element 92 lies generally parallel to one longitudinal edge of the slot 94 and is generally perpendicular to the plane in which the slot lies. As the pins 88 and 89 pass into the entrance slot 94 in a direction laterally of the pins, they pass generally along the plane of the guide element 92 and into contact with the electrical conductor 93, which lies along the face 96 of the guide element which faces the entrance slot 94. The electrical conductor 93 is biased toward the guide element 92 so that the pins 88 and 89 are driven into firm contact with the electrical conductor 93 after their insertion into the socket 86, as may be more clearly seen in the enlarged cross-sectional view of FIG. 10.

Figure 10:
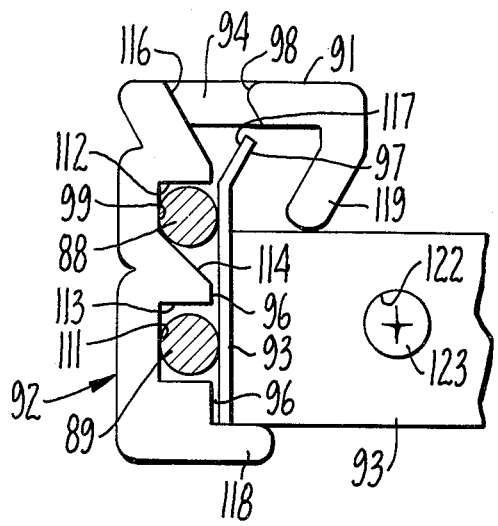
FIG. 10 is a partial cross-sectional view on an enlarged scale taken approximately along the plane of lines 10—10 of FIG. 8 with the lamp tube inserted.

It may be seen from FIGS. 8 and 10 that those portions of the guide element 92 and the electrical conductor 93 which lie in the vicinity of the pis 88 and 89 when the lamp is fully inserted into the socket 86 are generally planar in configuration. The plane of their configuration referred to is one which would be oriented vertically with one edge presented toward the viewer in the views of FIG. 8 and FIG. 10. The edge 97 of the conductor 93 nearest to the slot 94 is disposed to be adjacent to the longitudinal edge 98 of the slot 94 opposite the longitudinal edge of the slot 94 which is adjacent to the guide element 92. The juxtaposition is made by bending a portion of the conductor 93 near the edge 97 of the conductor back away from the guide element 92 and its generally planar face 96, with the balance of the conductor 93 remaining generally parallel to the guide element 92 and its face 96. As may most readily be seen from FIG. 10, the pins 88 and 89 of the base 87 are thus channeled between the conductor 93 and the guide element 92 upon entering the slot 94, and when the lamp is fully inserted into the socket 86 at least one of the pins 88 and 89 will be simultaneously in contact both with the conductor 93 and the guide element 92.

The guide element 92 is formed with a pair of grooves 99 and 111, lying parallel to the pins 88 and 89 of the base 87, and spaced to receive those pins into the grooves on full insertion of the lamp into the socket 86. The groove 99 and 111 function as detents to retain the lamp against accidental dislodgement from the socket 86. In each of the grooves 99 and 111, the edges 112 and 113, respectively, nearest the entrance slot 94 are formed to upstand perpendicularly from the guide element 92 so as to oppose movement of the pins 88 and 89 out of the socket 86. The groove 99 (the groove nearest the entrance slot 94) has its edge 114 farthest from the entrance slot 94 formed to upstand at an acute angle from the general plane of the guide element 92 to form a ramp member for easing the passage of the first pin 89 of the base 87 coming through the entrance slot 94 from the groove 99 nearest the entrance slot to the groove 111 farthest from the entrance slot 94.

A second ramp member 116 is formed adjacent the longitudinal edge of the entrance slot 94 to which the guide element 92 is adjacent. The second ramp member 116 is oriented parallel to the grooves 99 and 111 and is formed to cooperate with the electrical conductor 93 to channel with pins 88 and 89 of the bae 87 between the conductor 93 and the guide element 92. It may be seen that the function of the second ramp member 116 is essentially analogous to the function of the ramp member 114.

The previously-described edge 97 of the conductor 93 which is bent away from the guide element 92 along a line generally parallel to the longitudinal direction of the entrance slot 94 may be seen to form essentially a third ramp member 117 generally opposite in configuraiton to the second ramp member 116 and cooperating with the ramp member 116 to channel the pins 88 and 89 between the conductor 93 and the guide element 92.

A lip member 118 extends out from the bottom of the guide element 92 adjacent the bottom of the electrical conductor 93 to act both as a stop to prevent downward deflection of the conductor 93 and as a stop for the pins 88 and 89 to prevent excessively deep insertion of pins into the socket 86. Overtravel of the conductor 93 as it is bent away from the guide element 92 upon insertion of the pins 88 and 89 is prevented by an angled lip member 119 which depends from the top surface of the housing 91.

Electrical contact is made from the conductor 93 to the circuitry of FIG. 12 through a pair of slightly upstanding tab members 121 formed in the body of the conductor 93. As may best be seen at the upper end of FIG. 4, the upstanding tab members 121 make contact with a metallic portion of the body casing of the light 31 to complete the circuit indicated at the ground potential end of the lamps as shown in FIG. 12. As may best be seen from FIG. 9, the electric conductor 93 is formed as a single unitary element from a springy electrically conductive material which is bent to a slightly wider dimension than the spacing of the two sockets 86 and then is forcibly fitted into the housings 91 to form two of the sockets 86 at the same time.

To secure the coductor 93 in place in the housing 91 a pair of holes 122 are formed in the conductor 93 in alignment with a pair of upstanding studs 123 formed on the body of the end cap 124 to which the sockets 86 are attached. When the conductor 93 is inserted into the housing 91 the studs 123 pass through the holes 122 and may then be upset by heat or pressure to seal the conductor 93 in place. The body of the end cap 124 is preferably cast of an insulating plastic material in a single unitary piece with the housing 91 of the sockets 86, by a process such as injection molding.

As mentioned above, the conductor 93 illustrated in FIGS. 8 through 10 is that intended for use at the ground potential end of the lamp tubes 32 and 36. The high potential ends of the lamps 32 and 36 are searately energized so that a single lamp may be turned on, and accordingly the form of the conductor 93 is modified as shown at the bottom of FIGS. 4 and 5, and as shown in FIG. 7, by interrupting the conductor 93 at its midportion and bending upward the midportion of each of the halves of the conductor 93 to form a pair of tabs 126 and 127 to which separate wire leaads may be soldered. The conductors 93 at the high potential end of the lamps 32 and 36 are equipped with the holes 122 o fit around studs 123 as described above, but lack the upstanding tab members 121 for contact with the metallic body of the casing of the lamp 31. In all respects other than being broken at the middle, having the upstanding tabs 126 and 127, and the lack of the tabes 121, the conductors 93 at the high potential end of the lamp as shown in FIG. 7 are the same as the conductors 93 for the low potential end shown in FIGS. 8 through 10. It may be seen that the high potential ends of the lamps 32 and 36 are thus individually supplied with current from their respective separate conductors 93, neither of which is grounded to the metallic casing of the lamp 31.

The connections to the battery cells 21 are handled in a manner analogous to the connections to the lamp sockets 86. Thus at the low potential end shown in FIG. 6 there is a single metallic conductor 128 attached to the end cap by upset studs in the same fashion as the conductor 93. The conductor 128 has each end bent around approximately 180° in a U-shape, to form a spring contact member 129 for contacting the terminals of the cells 21. At the higher potential end of the lamps shown in FIG. 7, the end cap 124 is equipped with separate metallic battery contacting conductors 131 for makaing separate contact with each pole of the battery formed by the cells 21. The conductors 131 are each formed with upstanding tabs 133 for solder connection to wire leads, and are bent around in U-shape to form spring contact members for contacting the terminals of the cells 21 in the same fashion as the conductor 128 at the opposite end. Again, they are secured by upset studs passing through holes in the conductors 131.

Both end caps 124 are formed with channels 134 which align the conductors 93, 128, and 131 to prevent their movement and contact with undesirable portions of the apparatus. The wire conductors soldered to the tabs 133 are connected in the proper polarity to the lines 49 and 78 in FIG. 12, while the lines attached to the tabs 126 and 127 lead to the appropriate poles of the switches 38 and 39 to receive the high frequency alternating current from the secondary of the transformer 20.

Figure 11:
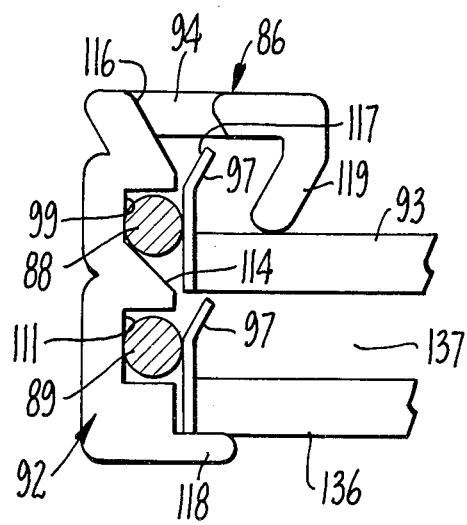
FIG. 11 is a partial cross-sectional view on an enlarged scale corresponding to FIG. 10 and showing a modified form of the socket structure.

With the modified form of the circuit shown in FIG. 13 for briefly pulsing the starter filaments of the low potential end of the lamp on start-up, a modified form of the socket 86 at the low potential end of the lamps 32 and 36 is used, shown in FIG. 11. In this form, the socket 86 is formed with a second electrical conductor 136 disposed within the housing 91 in confronting relation to the guide element 92 and insulated from the first conductor 93. Both of the conductors 93 and 136 are biased toward the guide element 92, and each is located opposite one of the grooves 99 and 111. Thus each of the conductors 93 and 136 separately contact one of the pins 88 and 89 iof the bipin base 87 to make electrical contact with that pin and urge the pin into its respective groove 99 or 111.

The second conductor 136 has its edge nearest the entrance slot 94 bent away from the guide element 92 at an acute angle along a line generally parallel to the longitudinal direction of the entrance slot 94 to form a ramp 97, essentially identical to the ramp 97 formed on the first conductor 93. To keep the two conductors 93 and 136 separate and in alignment, a ridge element 137 may be formed between them in the channel 134. In the portion of the first conductor 93 which is not shown in FIG. 11, that conductor may be provided with an upstanding tab member similar to the tab 121 for contacting the metallic casing of the lamp. The unseen end of the second conductor 136 should be formed with an upstanding tab simlar to the tab members 126 and 127 at the high potential end of the lamps so that a wire lead may be soldered to it for connection to the appropriate one of the leads 83 or 84 shown in FIG. 13. While only the left-hand member of a socket pair is showon in FIG. 11, the corresponding right-hand member would be essentially ssymmetrically identical to that.

Turning now to the general physical details of the lamp 31, with particular reference to FIGS. 1 and 2, the body 138 of the lamp 31 is formed from a unitary exrusion of a material such as aluminum, having a generally W-shaped crosssection as viewed in FIG. 2, with the upper end of the letter facing to the right. The body portion 138 is capped at either end by the plastic end caps 124 previously referred to. The end caps 124 are secured to the body of the extrusion 138 by self-tapping screws 139, which engage channels 141 formed in the extrusion 138. The lamps 32 and 36 are carried in truncated V-shaped troughs 142 formed by the upper end of the W-shape, the ends shown facing to the right in FIG. 2.

Passing to the left as shown in FIG. 2, the W-shape widens out into a circular cross-section of a diameter sufficient to enclose the battery cells 21. The forward portion of the trough 142 is closed off by a reflector 143 formed of a sheet of reflective material troughed into a generally parabolic shape, which is retained in the torugh 143 by lips 144 formed at either edge of the trough 143. A shield 146 of transparent plastic material closes over the entire face of the light 31 to protect the lamps 32 and 36 against breakage and the reflectors 143 against damage. The shield 146 is secured in place by having lips 147 bent to fit around the outer edges of each of the V-shaped troughs 142.

Channels 148 are formed in the rear portion of the extrusion 138, shown to the left of FIG. 2, for receiving the edges of a control panel 149. On the control panel 149 as seen in FIG. 3 are mounted the switches 38 and 39 aand the switch 77 shown in FIG. 12, together with the indicator lamp 76 and a socket 151 for connection of the lines 49 and 23 to the source of external d.c. power. The bulk of the circuitry of FIG. 12 is carried on a printed circuit board 152 which may in turn be mounted upon any of the components such as the switch 77, which are in turn mounted on the control panel 149.

One or both of the end caps 124 may be equipped with a handle 153 formed of a generally rectangular wire loop having each end journalled into one of a pair of sleeve-like bearing members 154 formed to upstand from the end cap 124. A small deflection 156 formed in the handle member 153 provides a frictional engagement against the upstanding forward edge 157 of the end cap 124 to allow the handle 153 to be folded down and retained in the folded position when its use is not desired.

The light 31 has a particularly advantageous feature akin to an emergency reserve capaity. After the light has been operated for a number of hours with both lamp tubes lit, the cells 21 reach the point at which the discharge limiting circuit 42 cuts off current flow. After a few seconds recovery period, the light 31 may be restarted on one lamp tube only, and will run for a substantial period of time before again reaching cutoff. The user whose light is cut off at a critical juncture may thus be able to operate the light at half capacity for long enough to extricate himself from a difficult situation, and yet understand that the useable battery charge is quite near exhaustion.

From the foregoing, it may be seen that a portable fluorescent light has been provided combining economy and simplicity of construction with increased efficiency and the use of inexpensive batteries with decreased internal battery impedance to produce a well-regulated, high frequency, alternating current output. The fluorescent light is virtually silent in operation and has automatic discharge and charge limiting features, and functions with a lightweight, inexpensive ballasting device. The inverter of the lamp utilizes the output transformer secondary as an element of a resonant tank circuit for a single-transistor class-C Hartley-type oscillator circuit. A novel lamp socket has also been provided which is adapted to ease insertion and removal of the lamp from the socket.

We claim:

1. A portable fluorescent light, comprising a source of direct current,
    a high frequency inverter for converting said direct current to alternating current,
    a fluorescent lamp supplied with high frequency alternating current from said inverter,
    a ballast means connected to said fluorescent lamp and adapted to limit current flow thereto, and
    a voltage sensing circuit connected to said source of direct current and said inverter and operative to terminate current to said inverter at a preselected voltage level of said source of direct current indicative of a condition of said source of direct current at which further discharge would be damaging to said source of direct current.

2. A portable fluorescent light as described in claim 1 and wherein said source of direct current comprises a plurality of storage cells.

3. A portable fluorescent light as described in claim 2 further comprising a constant-voltage current-taper charger circuit for charging said cells from an external source of direct current.

4. A portable fluorescent light as described in claim 3 and wherein said charge circuit comprises a zener diode connected in parallel with said cells and in series with a resistance to form a first voltage divider, a first transistor connected in parallel with said cells, a second voltage divider formed by a pair of resistances connected in series with each other and in parallel with said cells, a second transistor having its collector and emitter connected between the base of said first transistor and the common point between said zener diode and the resistance in series with said zener diode and having its base connected to the common point between the pair of resistors forming said second voltage divider, and a third transistor disposed in series between the external source of direct current and said cells, the base of said third transistor being connected to said first transistor to limit current flow through said third transistor upon decreasing conduction by said first transistor, whereby increased cell voltage as charging nears completion will increasingly forward-bias the base of said second transistor, causing in turn decreased forward-bias of the base of said first transistor, resulting in turn in diminished forward-bias of the base of said third transistor and thereby decreased current flow therethrough to said cells from said external source.

5. A portable fluorescent light as described in claim 4, and wherein said first transistor is an NPN transistor having its emitter connected to the positive pole of said cells, its collector connected to the base of said third transistor and its base connected through a resistor to the positive pole of the external source of direct current, said second transitor is an NPN transistor having its collector connected to the base of said first transistor, its emitter connected to the common point of said zener diode and the resistance in series with said zener diode, and said third transistor is PNP transistor having its emitter connected to the positive pole of said external source of direct current and its collector connected to the positive pole of said cells, the negative pole of said cells being connected to the negative pole of said external source of direct current.

6. A portable fluorescent light, comprising:
    a source of direct current comprising a plurality of storage cells;
    a high frequency inverter for converting said direct current to alternating current;
    a fluorescent lamp supplied with high frequency alternating current from said inverter;

a ballast means connected to said fluorescent lamp and adapted to limit current flow thereto; and a voltage sensing circuit connected to said source of direct current and said inverter and operative to terminate current to said inverter at a preselected voltage level of said source of direct current indicative of a condition of said source of direct current at which further discharge would be damaging, said voltage sensing circuit comprising a zener diode connected between the positive and negative potential supplied by said cells, a first transistor connected between the positive and negative poles of said cells and having its base connected through said zener diode to one pole of said cells so that the base of said first transistor is forward biased to drive said first transistor into conduction when said zener diode is conducting and reverse biased when said zener diode is non-conducting, and a second transistor connected between the positive and negative poles of said cells and having its base connected to said first transistor to be forward biased to cause conduction of said second transistor upon the non-conduction of said first transistor and reverse biased by the conduction of said first transistor to cut off said second transistor, the second transistor thereby inverting the signal from the first transistor, and said inverter comprising a third transistor operating normally as an oscillator, the base of said third transistor being connected to said second transistor so that the conduction of said second transistor reverse biases the base of said third transistor to cut off said third transistor.

7. A portable fluorescent light, comprising:

a source of direct current comprising a plurality of storage cells;

a high frequency inverter for converting said direct current to alternating current;

a fluorescent lamp supplied with high frequency alternating current from said inverter;

a ballast means conected to said fluorescent lamp and adapted to limit current flow thereto; and a voltage sensing circuit connected to said source of direct current and said inverter and operative to terminate current to said inverter at a preselected voltage level of said source of direct current indicative of a condition of said source of direct current at which further discharge would be damaging, said voltage sensing circuit comprising a zener diode having its anode connected to the negative pole of said cells, a first PNP transistor having its base connected to the cathode of said zener diode through a resistance and its emitter connected to the positive terminal of said cells, and a second PNP transistor having its emitter connected to the positive pole of said cells and having its base connected to the collector of said first transitor, said inverter comprising a third PNP transistor operating as a class C oscillator and having the emitter thereof connected to the positive pole of said cells and the collector thereof connected to the negative pole of said cells, the base of said third transistor being connected to the collector of said second transistor, whereby the lowering of the voltage of said cells below a selected point will cause said zener diode to cease conduction causing said first transistor to cease conduction, the cessation of conduction by said first transistor causing said second transistor to conduct and apply a steady positive potential to the base of said third transistor, causing said third transistor to cease conduction and thereby terminate major current outflow from said cells.

* * * * *